United States Patent [19]

Moncrieff-Yeates

[11] E Re. 30,043

[45] Reissued Jul. 17, 1979

[54] VORTICAL FLOW AEROTHERMODYNAMIC FIREPLACE UNIT

[76] Inventor: Alexander J. Moncrieff-Yeates, 8924 Rhyme Ct., Annandale, Va. 22003

[21] Appl. No.: 913,849

[22] Filed: Jun. 8, 1978

Related U.S. Patent Documents

Reissue of:

[64] Patent No.: 4,056,091
Issued: Nov. 1, 1977
Appl. No.: 570,798
Filed: Apr. 23, 1975

[51] Int. Cl.[2] ..... F24B 7/00

[52] U.S. Cl. ..... 126/121; 126/131

[58] Field of Search ..... 126/120, 121, 130, 131; 165/168, 169; 237/51; 431/4, 158; 60/39.65, 39.69; 62/136, 170

[56] References Cited

U.S. PATENT DOCUMENTS

| | | | |
|---|---|---|---|
| 53,880 | 4/1866 | Rogers | 126/121 |
| 142,241 | 8/1873 | Kepler | 126/131 |
| 241,720 | 5/1881 | Ricketts | 126/130 |
| 773,863 | 11/1904 | Frecktling | 126/120 |
| 1,526,541 | 2/1925 | Groth | 126/121 |
| 1,714,955 | 5/1929 | Helms | 126/121 |
| 1,952,281 | 3/1934 | Ranque | 62/170 |
| 2,185,788 | 1/1940 | Fredlund | 126/121 |
| 2,586,002 | 2/1952 | Carlson, Jr. et al. | 62/136 |
| 2,642,859 | 6/1953 | Brown | 126/121 |
| 2,705,488 | 4/1955 | Wright | 126/121 |
| 2,821,975 | 2/1958 | Thulman | 126/120 |
| 3,007,310 | 11/1961 | Eisele | 60/39.69 |
| 3,030,773 | 4/1962 | Johnson | 60/39.65 |
| 3,096,754 | 7/1963 | Howry | 126/120 |
| 3,118,489 | 1/1964 | Anthes | 431/158 |
| 3,255,802 | 6/1966 | Browning | 431/4 |
| 3,258,052 | 6/1968 | Wilson et al. | 431/158 |
| 3,266,466 | 8/1966 | Fehr | 122/136 |
| 3,372,689 | 3/1968 | Goudy | 126/140 |
| 3,896,785 | 7/1975 | Nelson | 126/121 |

FOREIGN PATENT DOCUMENTS

| | | | |
|---|---|---|---|
| 675375 | 2/1930 | France | 126/120 |

*Primary Examiner*—Ronald C. Capossela
*Attorney, Agent, or Firm*—Sixbey, Friedman & Leedom

[57] ABSTRACT

A heat exchanger particularly for use in a circulating hot air fireplace is constructed to induce vorticity in the flame and/or hot combustion gases at a position in proximity to a heat exchange surface to enhance residence time and thermal transfer to the circulating air.

The vorticity pattern acts as a self-adjusting flow controller.

21 Claims, 11 Drawing Figures

Fig. 1
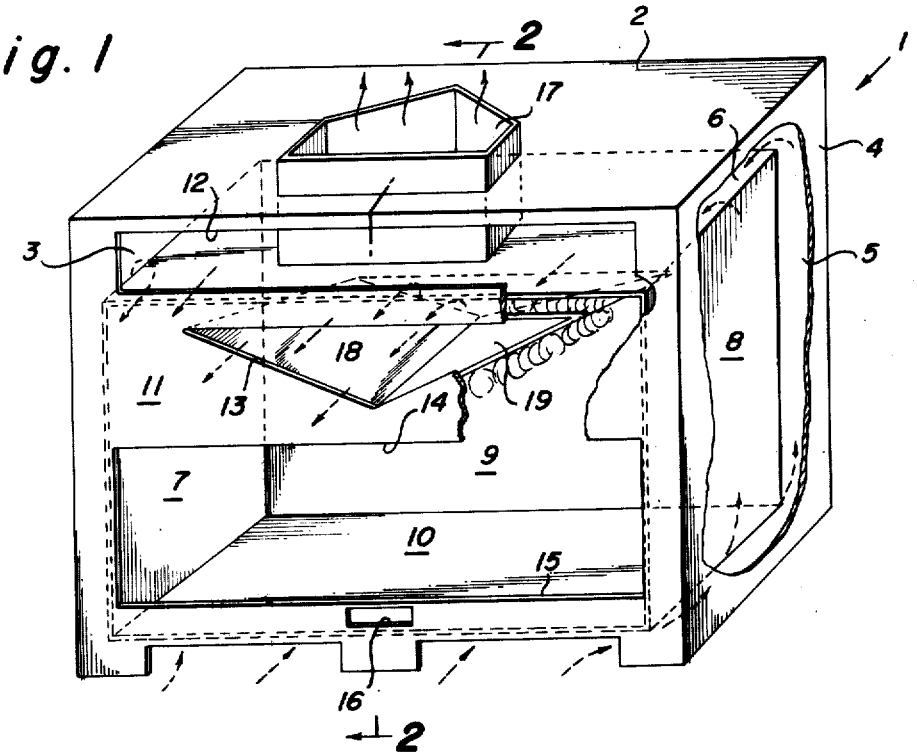
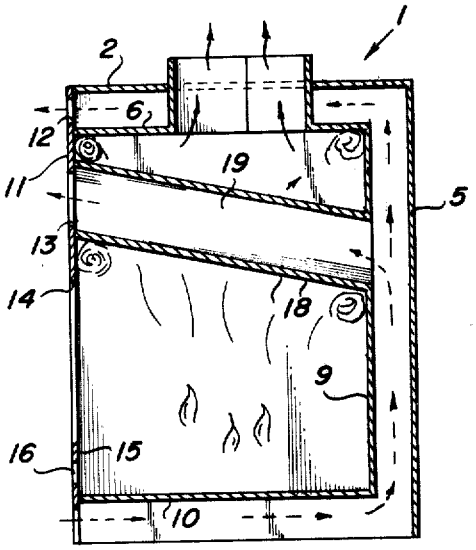
Fig. 2
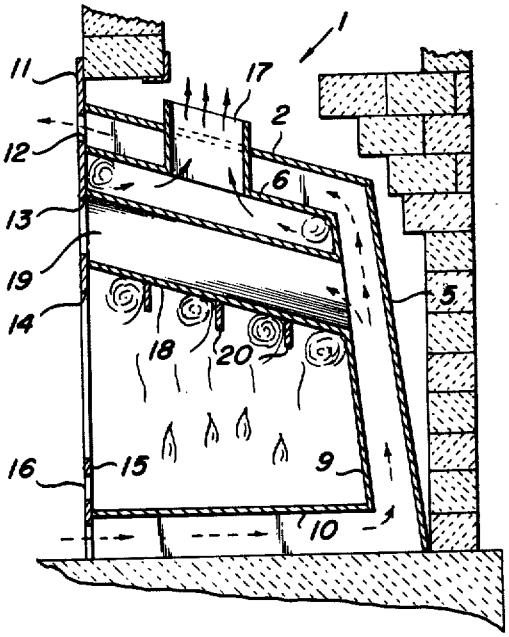
Fig. 3

Fig. 9
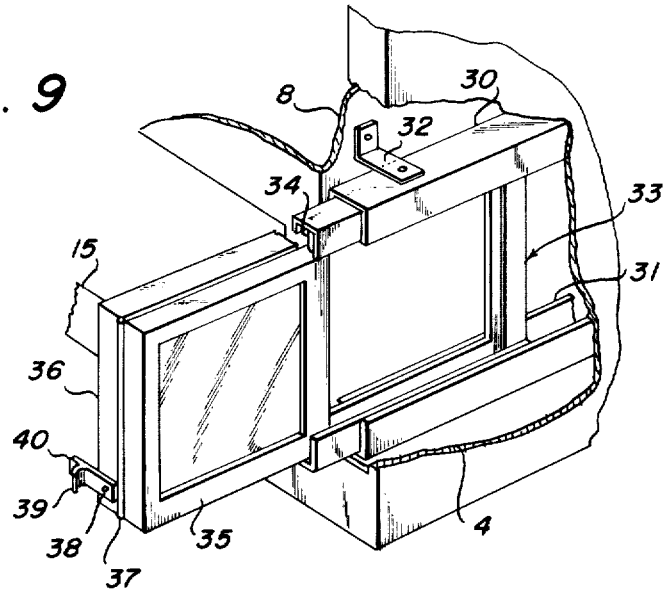
Fig. 10
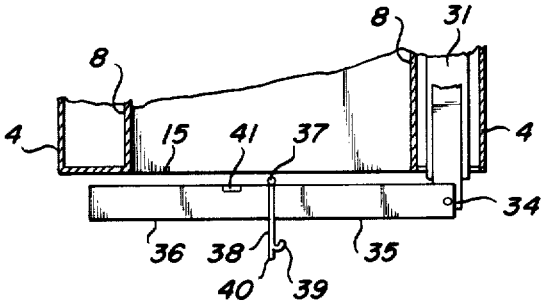
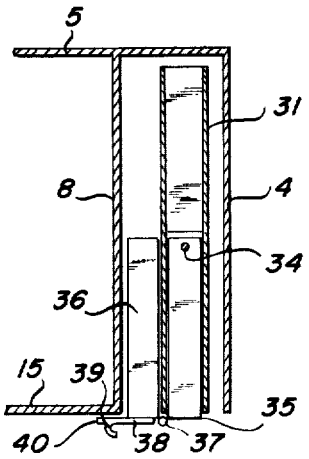
Fig. 11

VORTICAL FLOW AEROTHERMODYNAMIC FIREPLACE UNIT

Matter enclosed in heavy brackets [ ] appears in the original patent but forms no part of this reissue specification; matter printed in italics indicates the additions made by reissue.

FIELD OF INVENTION

This invention relates generally to *heat exchangers, and is particularly applicable to furnaces and* fireplace units wherein room air is circulated, either by convection or by mechanical forcing means, in heat exchange relationship to a combustion chamber and returned to the room in heated condition.

BACKGROUND OF THE INVENTION—PRIOR ART

Considering first the prior art relating to air circulating fireplaces, it is known to construct fireplaces or inserts therefor which provide means to circulate room air through passages in the walls defining the combustion chamber to absorb heat from the source, after which the heated air is returned to the room. This art includes elaborate labyrinthian passages for the room air and combustion air alike in an attempt to lengthen the period of residence of the respective flows in mutual heat exchange relationship, as exemplified by U.S. Pat. No. 2,642,859, issued June 23, 1953 to Newman T. Brown. Moreover, it has been proposed to so dimension the combustion chamber that an unconfined slowly descending recirculating flow of combustion air is encouraged, as seen in U.S. Pat. No. 773,863, issued Nov. 1, 1804 to Mary F. Frecktling, and to provide confined passages to direct a recirculating flow, as in U.S. Pat. No. 2,821,975, issued Feb. 4, 1958 to Robert K. Thulman, in U.S. Pat. No. 2,185,788, issued Jan. 2, 1940 to August R. Fredlund, and in U.S. Pat. No. 53,880, issued Apr. 10, 1866 to Francis M. Rogers. It is noted that the Frecktling disclosure recirculates only the slowly moving portion of the combustion products, the principle heat containing portion passing directly to the flue. On the other hand, the other disclosures in which substantial portions of the combustion flow are recirculated in confined paths requires the introduction of structural impedance to the gas flow and depends upon the presence of a large expanse of heat exchange surface.

Turning to the art relating to combustion generally, it is well known to induce a helical flow of a fuel/air mixture in order to increase the residence time of the mixture within the combustion zone and thus enhance complete combustion, and it has been suggested that such an effort may be augmented by restricting the outlet of the combustion chamber or by introducing a supplemental forced air flow. For an example of this art, reference is to U.S. Pat. No. 3,007,310, issued Nov. 7, 1961 to Karl Eisele and to U.S. Pat. No. 3,258,052 issued June 28, 1966 to Alfred Wilson, et al. Augmentation of the spiral flow of air/fuel mixture has also been proposed by flow conditions which induce an annular tore comprising a flame vortex adjacent the base of the flame in U.S. Pat. No. 3,030,773, issued Apr. 24, 1962 to Robert H. Johnson and in U.S. Pat. No. 3,255,802 issued June 14, 1966 to James A. Browning. A similar flow is induced within the area of air/fuel mixing in U.S. Pat. No. 3,118,489, issued Jan. 21, 1964 to Clifford C. Anthes.

Considering the prior art even more generally, in the field of heat exchange it is known to induce a gaseous medium to flow in a vortical pattern extending axially of a tubular conduit in order to increase residence time, enhance scrubbing action and to obtain an interchange of position of the molecules of high velocity and temperature gases from the center of the vortex with the outer molecules which have been deprived of their energy and velocity through functional heat exchange contact with the vortex tube in which the vortical flow is confined. This is exemplified by the well known "Ranque" tube (U.S. Pat. No. 1,952,281, Mar. 27, 1934) and see U.S. Pat. No. 2,586,002, issued Feb. 19, 1952 to W. R. Carson, Jr. et al.

In summary, the prior art is known to disclose inducement of vortical flow in precombustion gases and basal portions of flame patterns for the purpose of enhancing the mixing of the fuel air mixture, and the prior art discloses inducement of hot gas vorticity axially of confined conduits of heat exchangers.

OBJECTS OF INVENTION

In contradistinction of the foregoing, it is among the objects of this invention to provide an aerothermodynamic heat exchange structure including features which 1. a stable, relatively unconfined flow of hot gases is induced and maintained throughout varying conditions of temperature and velocity,
2. the hot gas vorticity is established proximate to a heat exchange surface at which hot gas residence time is prolonged, thus enhancing heat exchange,
3. the vortex axis of the hot gas is perpendicular to the hot gas flow entering and exiting the vortex area whereby the vortex fluid impedance varies with variations in hot gas velocity,
4. a vortical hot gas flow pattern is maintained in a heat exchanger which presents minimal structural impedance to gas flow,
5. a hot gas flow path is maintained free of areas of aerodynamic stagnation,
6. the area of heat exchange surface is minimized,
7. the area of frictional contact of flowing gases with flow conduits is maximized,
8. a self-regulating draft is established by vortex imposed aerodynamic impedance,
9. the structure is readily adaptable to domestic furnace or fireplace installation as original equipment or as a modification of preexisting conventional fireplaces or furnaces.

DESCRIPTION OF DRAWINGS

The aforestated objects, as well as other objects inherent in the apparatus of this invention will be apparent from a consideration of the ensueing specification and reference to the drawings, in which FIG. 1 is a perspective view of a fireplace unit having portions of the front end and one side broken away to reveal interior features in cross section, FIG. 2 is an elevational cross section taken through line 2—2 of FIG. 1, FIG. 3 is a view similar to that of FIG. 2 of an alternative embodiment, FIG. 9 is a perspective view of a portion of a fireplace broken away to disclose door mounting details, FIG. 10 is a plan view of the door in closed position, and FIG. 11 is a horizontal cross-section, a portion of a fireplace revealing a door in stored position.

TERMINOLOGY

Figure 4:
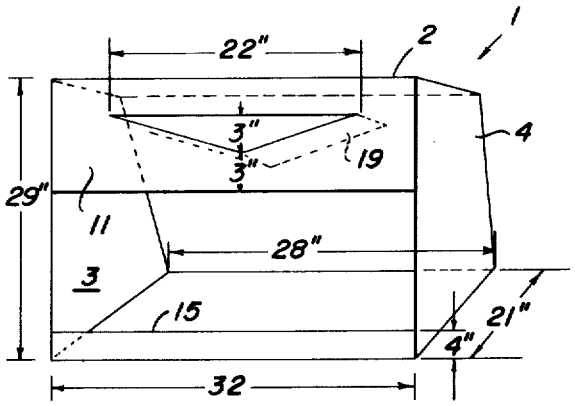
FIG. 4 is a dimensional diagram of a preferred embodiment, FIG. 5 sets forth alternative duct configurations.

This invention relates to the phenomena of heat exchange between a heated high velocity gas induced to flow in a relatively confined vortical pattern in close proximity to a heat exchange surface through which heat is transmitted to a relatively cooler fluid. In order to maintain a distinction between the aforementioned prior art in which vortical patterns are produced at basal portions of a flame for the purpose of enhancing combustion, this specification will refer to the heated gas as the donative gas and to the cooler fluid as the recipient. Thus, donative gas is that gas which has been brought to a temperature condition where it is ready to be introduced into the heat exchange relationship and may include portions of the flame in which combustion is sufficiently complete to have brought about the aforesaid temperature condition, as well as combustion products immediately downstream of a flame, or gas heated at a remote point. Recipient fluid, on the other hand, is any fluid, i.e., liquid or gas, which received heat from the donative gas.

DESCRIPTION OF INVENTION

Referring first to FIGS. 1-3, there are depicted fireplace units, each comprising an outer enclosure generally designated 1 and including a top wall 2, side walls 3 and 4, and a back wall 5. Spaced inwardly from said outer enclosure walls is a fire enclosure defined by a top wall 6, side walls 7, 8, a back wall 9, and a bottom 10. Both enclosures share a common partial front wall 11 extending downwardly from the top wall 2 and defining a plurality of openings, namely an upper recipient gas exit at 12, a lower recipient gas exit at 13, and a fire enclosure opening at 14. A barrier lip 15 on the front wall which is immediately superjacent to the fire enclosure bottom 10 for purposes to be elaborated on in the ensueing specification, includes one or more openings 16 to provide the entrance of combustion air. These openings may be provided with appropriate flow control valves (not shown) to provide controllable draft. A combustion gas exhaust passage for communicating the fire enclosure with a flue is defined by a duct 17. FIG. 3 discloses alternative embodiment configured so as to be particularly adaptable to existing fireplaces, and wherein the backs 5, 9 and top 2 are sloped.

A still further alternative (not shown) would eliminate the outer enclosure and utilize the existing fireplace enclosure in lieu thereof.

In FIGS. 1-3 the path of the room air through the unit, wherein it is termed recipient air to denote its function of reception of heat for conveyance to the room area by convection, is traced by dashed line arrows, whereas the path of heated combustion products, termed donative gas, is denoted by solid line arrows. In the latter regard, particular attention is invited to the path of the donative gases (which may include the flame under some conditions and/or the intensely heated gases downstream of the flame under other conditions) by which they are brought in contact with the undersurface 18 of a duct 19 interconnecting the recipient air passage through an opening in rear combustion chamber wall 9 with the recipient duct exit 13. The undersurface forms a flame plate whereby, at the points of juncture of this flame plate duct 19 with the partial front wall and with the rear wall, the donative gas flow is induced to flow in a pattern of vorticity which remains stable throughout a wide range of temperature and velocity. Again, after leaving the aforementioned vorticies, the combustion gases encounter the juncture of the back and front walls 9 and 11 with the flame enclosure top wall 6, vortical flow patterns are again established and maintained in a stable persistent pattern throughout varying flow conditions. In the present model, four front vortices exist under all tested operating conditions and four additional (rear) vortices arise when the fire extends sufficiently rearwardly in the flame enclosure. Additional vortices may be induced by the provision of lateral fins 20 (FIG. 3) to the underside of the flame plate surface 18. These fins serve to augment the stabilization of the aforementioned vortices and to establish additional vortices either independently under high velocity conditions, or as the original stable vortex increases in translational velocity and in circumference to a point where it overflows the partial barrier formed by the fin and adopts a vortical flow pattern in the adjacent channel defined by the flame plate 18 and the fins 20.

While depicted in FIGS. 1-3 as a complete insert unit, it is readily apparent that the essence of this invention is equally applicable to an insert which utilizes an existing fireplace as the flame enclosure, and wherein the insert includes only the flow diverting flame plate, and the vortex defining juncture is formed of additional flow diverting elements extending from a juncture with the flame plate toward the flame.

In each instance, the stable vortical patterns of donative gas flow are established by structure which presents a partial barrier (i.e. the underside 18 of the flame plate duct 19 and the top of the flame enclosure) to the otherwise free unobstructed flow of hot donative gas toward the flue while permitting the flue to draw off gases from the end of the vortex so formed. The latter function is enhanced by slanting the barrier in its longitudinal direction upwardly in the direction of gas flow so that the long axis of the vortex coincides with the predominent direction of ultimate gas flow and thus leads toward the flue opening.

Figure 5:
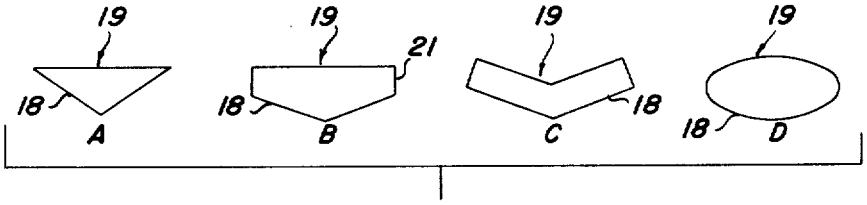

In addition to the aforementioned longitudinal slant of the flame plate 19, it is desirable to provide a pitch in a direction transverse to the slant direction, thus to establish an axial flow within the vorticity pattern. To this end, the flame plate 19 should have a transverse pitch of approximately 15 degrees, the pitch being transverse to the slant and directed upwardly to a free edge which edge coacts with a contiguous area of the enclosure wall 8 to define a portion of the donative gas flow path therebetween. In the preferred embodiment wherein the flame plate 19 extends through the center of the enclosure, thus dividing the enclosure into two donative gas flow portions, the flame plate diverges laterally outwardly from a longitudinal central portion of the plate to terminate at two free edges defining the two flow path portions. Examples of permissible cross-sectional configurations of a flame plate duct of the last-named type are diagramatically illustrated in FIG. 5. These include a triangle (FIG. 5A), a modified triangle or polygon (FIG. 5B), a chevron (FIG. 5C), and an ellipse (FIG. 5D).

A preferred size as set forth in relation to FIG. 4 prescribes a horizontal minor dimension of 22 inches, a vertical minor dimension of 3 inches, and a divergent pitch of 15° in the flame plate surface. This pitch is established at 0.5 to 2 times the slant angle of flame plate duct 19 from the rear wall 9 to the partial front wall 11. The aim is to present a partial barrier to the upward donative gas flow, thus causing the gas to arrive at the aforementioned junctures and form vortices commencing at the low point (center portion) of flame plate 19 and extending upwardly in each lateral direction to terminate at a free edge of said flame plate spaced from a contiguous portion of the enclosure wall 8.

The cross sectional pitch configuration and longitudinal slant of the duct also has certain beneficial effects on the flow therethrough of recipient gases. First, the combination of upward pitch from front to rear and from center to sides tends to encourage lateral flow patterns within the flame plate duct 19 by virtue of the increased tendency of the heated recipient gas to lift off a sloped surface. Thus, slowly spiralling counterrotating recipient gas currents occuring at respective sides of the center line of the duct disrupt otherwise lamellar flow patterns, whereby to assist in the suspectibility of the recipient gas to heat exchange. Secondly, the preferred embodiment of FIG. 5B enhances this circulation by providing sufficient heights above the extreme lateral extent of the flame plate 18 for the lift off of recipient gas to occur, tending toward an equilization of flow through the duct 19 at its center and at its sides. The sides 21 should be limited in height as shown inasmuch as they are not in proximity to the vortices of the donative gas and hence are relatively ineffective as heat transfer surfaces.

The sum of the areas of the two recipient gas exits 12 and 13 with respect to the area of the bottom air inlet should be such that the mass flow of the inlet gas at room temperature approximates the sum of the mass flows of the recipient gas at the respective temperatures of exit, which have been found typically to be 200° F. at exit 12 and 300° F. at exit 13.

In a model dimensional as set forth in connection with FIG. 4, stable vortices are maintained at rotational speeds of approximately 100 rotations/second in a vortex of 4 inches diameter while the longitudinal velocity is about 2 feet/second. Since, in this example, heat transfer surface is present around half of that circumference, an effective exchange surface path over a one foot segment of the distance from fire to flue is $$\frac{100 \times \pi \times 4}{12 \times 2} = 50 \text{ feet}$$

Where the heat exchange surface surrounds more than half of the vortex, the denominator is correspondingly decreased. Since each vortex is 2 feet long, the effective scrubbing or heat exchange surface is $50 \times 2 = 100$ square feet, whereas the volume of each vortex is $$\frac{\pi \times 4^2 \times 2}{144 \times 4} = 1/6 \text{ cubic feet}$$

The vortices tend to decrease the effective size of the donor gas conduit to the flue by expanding into the open area of the flue, or stated conversely, tend to increase the aerodynamic impedance. Empirical design can achieve a self adjusting system wherein the effective flue impedance is least when the convection is least and increases as convection increases. This mechanism is not fully understood, but appears to depend upon the matching of aerodynamic impedance at various cross sections along the flow path in such a way that the vortices enlarge and contract in diameter as the fire increases and decreases in heat output. To this end, the vortex inducing structure must not totally confine the circumference of the vortex, but must leave an opening on at least one side sufficient to permit the aforementioned expansion. An increase in diameter of adjacent vortices brings about an increased choking effect to the straight flow of gases therebetween, thus serving as a damper to increase aerodynamic impedance as fire intensity increases. The design should preserve a consistency of aerodynamic impedance throughout the flow path of the donor gas, i.e., the sum of the cross-sectional open air areas in the upper reaches of the combustion chamber should approximately equal the cross-sectional area of the flue duct 17, which is smaller than the average chimney flue in cross-section. Moreover the partial barrier formed by the undersurface 18 of the duct 19 must be substantial and has been found to be most effective when the width of the duct approximates ¼ or more or the total width of the flame enclosure. Adherence to these basic parameters has found embodiment in an experimental fireplace including a fire enclosure dimensioned as indicated in FIG. 4 having a width of 32 inches in the front tapering to a 28 inch width in the rear, a front height of 29 inches, and an 18° slope from front to rear of the enclosure top 2 and of the recipient air duct 19. This unit includes a 4 inch barrier 15 and has a front-to-rear depth of 21 inches at the base, tapering to a 15 inch depth at the top. An optimum flue duct opening 17 is 48 square inches, and is preferably symmetrically triangular or polygonal in shape with a major dimension extending to an apex in the rear half of the top 6 (see FIG. 1). Inasmuch as the slant angle of the flame plate 18 serves to direct the major donative gas flow toward the juncture with the partial front wall 11, the one front juncture is the first to form a vortex and is the preferred heat exchange area. Hence, it is desireable to position the flue duct so as to induce the major donative gas flow in the front of the enclosure. A triangle having an 8 inch base positioned approximately 4 inches behind the forward edge of top 6, and said major dimension of 12 inches maintains a 48 square inch cross sectional area and positions the apex near the rear of the top 6. Flue duct openings as large as 64 square inches are feasible, as are variations in cross sectional configurations, such as square, rectangular, trapezoidal, parallegram. In any configuration, however, the major area of the opening should reside in the front half of the top 6 where it is downstream of said one front juncture.

Another design factor which has a surprisingly significant effect on the overall balance of aerodynamic impedance is the impedance presented by the barrier lip 15. Surprisingly, the width and height of the opening above the lip 15 have little effect, yet a barrier lip which is too low results in instable vortices and inefficient drafts. It appears that the predominant flow of combustion air into the flame chamber is through the lower portion of the opening superjacent to the lip 15. Hence, the effect of the height of this barrier lip relative to the position of the fire is significant due to imput damper effect on the predominant flow.

Figure 6:
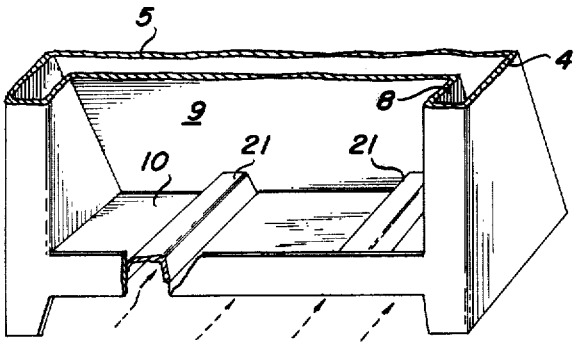
FIGS. 6, 7 and 8 are perspective view of a portion of a fireplace.

In view of the pronounced effect of the impedance offered by the relative height of barrier lip 15 in relation to the fire, it is proposed in an additional embodiment to provide an inbuilt grate structure whereby the fire will be supported at a predetermined height which is not dependent upon that of an independently acquired grate. Such a structure is illustrated in FIG. 6, wherein a pair of spaced grates 21 extend from front to rear. The grates have a cross-sectional configuration of an inverted channel with the underside open through the flame enclosure bottom 10 to permit the flow of recipient gas into and through the channel shaped grates 21. This opening may extend the entire length of the grate, or may involve only a portion thereof. It is preferred that the channel so provided open through the fire enclosuure back 9 to provide unobstructed flow of the recipient gas to the passageway defined between surfaces 5 and 9. This hollow grate thus provides additional heat exchange surface in close proximity to the fire whereby heating of the recipient gas is augmented and, conversely, the flow of relatively cool incoming recipient gas has a cooling effect on the hollow grate which avoids the danger of burnout of the metal structure.

Figure 7:
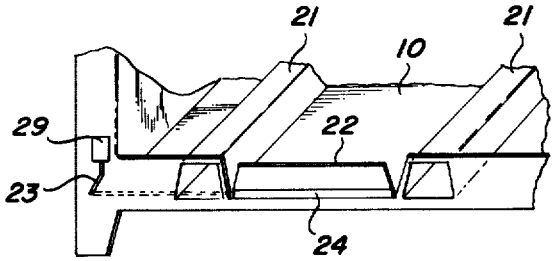

Still further in recognition of the significant effect of the height of the barrier 15 relative to the fire, this invention contemplates a barrier of adjustable height, which may take the form but is exemplified by a pivoted vane 22 of FIG. 7 positioned between the grates 21 as shown, or may be positioned on the upper edge of barrier 15, in which instance the vane 22 can extend the full width of the fire enclosure opening. Either structure may be manually controlled, as by a handle 23 attached to the vane pintle 24, or it may be thermostataically controlled by a motor 29 responsive to a thermosensitive element (not shown) placed in the room environment. As the barrier vane 22 is raised, the upper limit of fire intensity is decreased.

Figure 8:
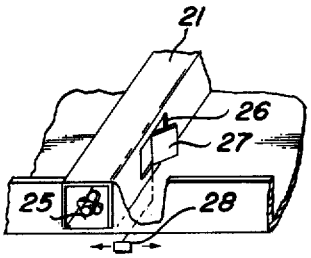

In each of the aforedescribed embodiments, dependence is solely upon natural draft. A somewhat faster draft control may be effected by a forced draft created by a fan, such as a "muffin" fan 25 placed in the channel of the grate 21 as seen in FIG. 8. This modification is particularly useful during start-up inasmuch as the fan 25 may be used to forcibly supply ambient air to the recipient air passageways as in the previously described embodiments while at the same time bleeding off a portion of the forced air flow as combustion air to the fire. To this end, a draft opening 26 is provided on the fire side of grate 21, and said opening is controlled by a vane 27 shown as being manually controlled as by handle 28. Vane 27 may, of course, be controlled by a thermally sensitive system, as by a bimetallic motor element (not shown) responsive to a thermal sensor which appropriately may be placed in the recipient air duct discharge opening 13. The use of the same forced air supply for recipient air and for combustion air is particularly advantageous as the optimum mass flows of the two bears an inverse relationship. At start-up or other low burning conditions during which heat exchange surface temperatures may be as lcw as 100°-200° F., the ratio of mass flow of recipient air to draft air should be relatively low, whereas during high intensity burning conditions at temperatures of, say, 800°-1000° F., the opposite is true. The fan 25 may be controlled by a room thermostat of conventional design (not shown). Fan 25 advantageously is placed near the room air intake where convective flow of the ambient temperature air is sufficient to cool the fan when not operating and thus to avoid heat damage thereto.

A further advantage of the basic structure of this invention resides in the capacity of the unit to function with no loss of efficiency when glass doors are employed in the fire enclosure opening 14. Glass doors have been employed in conventional fireplaces for purposes of safety and of eliminating excessive loss of room air to the flue. However, the doors accomplish these objectives only at a sacrifice of heating value to the room by virtue of the elimination of convective flow from enclosure to room and diminished direct radiation. In this invention, in which major dependence is upon heat exchange from donative gas to the recipient gas and subsequent convective or forced air flow to the room rather than upon direct convection and radiation, the sacrifice is minimized to an extent of virtual inconsequence while the advantages still attain.

To this end, there may be provided as seen in FIGS. 9-11, a recess in one or both sides of the fireplace, the recess being partially defined by side walls 4 and 8. Disposed within said recess is a track comprising an upper element 30 and a lower element 31 secured in place by any suitable means, such as brackets as at 32. Slidable in the track 30, 31 is a carrier generally indicated at 31 which carries a hinge pintle 34. Pivotally supported upon pintle 34 is a door here shown as a folding door comprising a pair of glass panels 35, 36 pivotally interconnected as a hinge pintle 37. A non-folding door can be provided, in which it would be appropriate to provide a track and carrier on each side of the fireplace to accommodate duplicate doors. In the preferred embodiment of a folding door, a convenient handle 38 is attached to the hingedly connected end of door 36 comprised a free end which is forked to provide a hooked finger tab 39 and a straight thumb tab 40. By virtue of its placement at a low position on the door, this handle remains cool to the touch. By engagement of the thumb and forefinger with the tabs 40 and 39, respectively, the door may readily be pulled from its retracted position shown in FIG. 11 to be extended position of FIG. 9, this motion being accommodated by the sliding of the carrier 33 in the track elements 30, 31. At this point, a rotary motion by the thumb and finger pivots door 36 with respect to door 35 and permits bringing the door to the closed position illustrated in FIG. 10, at which a permanent magnet 41 retains the door in position against barrier 15.

The fireplace of this invention is particularly well adapted to the use of doors such as the aforedescribed partially because the reliance on underdoor combustive air intakes makes the unit independent of the normal fire enclosure opening for adequate combustion. This is particularly true with the forced air provision of FIG. 8, and to a lesser extent in units involving natural draft intakes such as 16. Another factor in adaptability to doors is the reliance on convective flow of the recipient gas rather than dependence upon direct radiation to the room. Finally, the ambient air passageway defined in part by sidewalls 4 and 8 provides a convenient receptacle for the doors when open and in stored condition, the interference of the door with recipient gas flow being insignificant, whereas the radiation reflective properties of the glass provide supplemental insulation to reduce heat loss through outer side wall 4.

While described in the foregoing specification in the preferred embodiment of a fireplace, the aerothermodynamic heat exchanger of this invention which employs vortical flow patterns to enhance heat transfer between a relatively unconfined donative gas flow path and an isolated recipient gas flow may find numerous other heat exchange applications. Hence, the scope of this invention is not considered to be limited by this specification, but should be construed in accordance with the following claims.

I claim:

1. A heat exchange structure for use [in a fireplace] *with a firebox* of the type including an enclosure for a fire producing a hot thermally donative gas, said enclosure comprising side walls, a back wall, and a top wall, a flue opening in said top wall for exhausting said donative gas, an outer enclosure comprising walls spaced outwardly from said fire enclosure walls and defining therebetween passages for a thermally recipient air, a front wall extending downwardly from a front portion of said top wall and including a fire enclosure opening therein, means communicating air from said thermally recipient air passages through said front wall, said means comprising a duct extending between junctures with said back and front walls through a central portion of said fire enclosure, said structure further characterized in that said duct has a bottom surface comprising a flame plate for exposure to said donative gas in said enclosure, said flame plate being slanted upwardly toward one of said junctures to define throughout the extent of said one juncture a laterally extensive thermally donative air vorticity area throughout which the donative air is induced to whirl in a stable vortex proximate to and in heat exchange relationship to said flame plate and said wall structure.

2. The structure of claim 1 wherein said flame plate includes a free edge spaced from a contiguous portion of said fire enclosure side wall to define a portion of said donative gas flow path therebetween, said flame plate being pitched in a direction transverse to said slant and toward said free edge whereby the axis of the induced vortical pattern is pitched in the general direction of gas flow and terminated beyond said free edge.

3. The structure of claim 2 wherein the cross-sectional area of said portion of said donative gas flow defined by said free edge and said contiguous enclosure wall portion bears a substantially equal relationship to the cross-sectional area of said exhaust flue opening.

4. The structure of claim 1 wherein said flame plate includes two free edges each spaced from the respective contiguous portions of said fire enclosure walls to define on either side of said duct a pair of portions of said donative gas flow paths therebetween, said pitch of said flame plate diverging laterally outwardly from a longitudinal central portion thereof to each said free edge.

5. The structure of claim 4 wherein the sum of the cross-sectional areas of said donative gas flow paths on either side of said duct bears a substantially equal relationship to the cross-sectional area of said exhaust flue opening.

6. The structure of claim 4 wherein the width of same flame plate is at least ¼ the width of said flame enclosure.

7. The structure of claim 4 wherein said pitch is substantially 15°.

8. The structure of claim 7 wherein the ratio of said slant angle to said pitch is substantially within the range of 0.5 to 2.

9. The structure of claim 1 wherein said exhaust opening has its major area disposed downstream of said one juncture.

10. The structure of claim 9 wherein said exhaust flue opening has at least a portion thereof of substantially triangular cross-sectional configuration, the base of said triangular constituting said major area and the apex extending away from said one juncture toward the other of said junctures downstream thereof.

11. The structure of claim 1 wherein said flame plate includes lateral fins projecting downwardly into said fire enclosure and extending substantially parallel to and spaced from said junctures, said fins coacting with said flame plate surface to define additional areas for vorticity patterns of donative gas flow.

12. The structure of claim 1 wherein said front wall includes an additional portion comprising a barrier lip extending upwardly from said fire enclosure bottom, said barrier lip being adjustable in height.

13. The structure of claim 1 wherein said fire enclosure bottom includes spaced elongated hollow grates extending from front to rear, said grates comprising inverted channel shaped elements having at least a portion of the underside of said channel open through said bottom and being open to communicate with said passage for thermally recipient air.

14. The structure of claim 13 wherein said tubular grate elements include a draft opening in a side of said tubular element for communicating a portion of the accepted ambient room air with the lower portion of said fire enclosure.

15. The structure of claim 14 wherein said draft opening includes a flow control vane, said vane being controlled by a thermally sensitive element.

16. The structure of claim 1 wherein said front wall includes an additional portion comprising a barrier lip extending upwardly from said fire enclosure bottom, and wherein said fire enclosure includes spaced grate elements extending from front to rear, said grate elements each comprising a tubular member open through said barrier lip to accept ambient room air and open through said enclosure rear wall to discharge air to the rear said passage for thermally recipient air.

17. The structure of claim 16 wherein said tubular grate elements include air forcing means disposed within said tubular element near said opening through said barrier lip.

18. The structure of claim 1 wherein said front wall has a recess adjacent to said fire enclosure opening, said structure including a door assembly movable from a closed position covering said flame opening to a stored position within said additional opening.

19. The structure of claim 18 wherein said recess is disposed within said recipient air passage, a horizontal track is disposed within said recess, a carrier is slidably mounted upon said track, and said door assembly is pivotally mounted to and carried by said carriage for pivotal movement from said closed position to an open position aligned with said recess, and said carrier is movable from an extended to a retracted position within said recess to totally confine said door assembly within said recess.

20. The structure of claim 9 wherein said door assembly comprises a folding door composed of at least two panels, one said panel having one end pivotally supported by said carrier and another said panel being hingedly connected to the unsupported end of said one panel, a handle element rigidly secured to the hingedly connected end of said another panel whereby said handle may be used for movement of said door assembly between said closed, open and stored positions.

21. A heat exchange structure for use [in a fireplace] *with a firebox* of the type including

*an* enclosure for a fire producing hot, thermally donative gas, a flue opening for exhausting said gas, means for conducting ambient room air in heat recipient relationship to said hot, thermally donative gas, said structure characterized in the inclusion of means to divert at least a portion of said thermally donative gas in a vortical pattern, said means comprising a duct comprising a portion of said recipient gas conducting means, said duct having a bottom surface comprising a flame plate exposed to said donative gas in said enclosure to form a partial barrier to the flow of said donative gas to said flue opening, additional partial barrier means comprising a surface extending toward said donative gas source and intersecting said bottom surface to form therewith a juncture defining a laterally extensive thermally donative air vorticity area throughout which donative air is induced to whirl in a stable vortex proximate to and in heat exchange relationship to said flame plate.

* * * * *